United States Patent
Ben-Rubi et al.

(10) Patent No.: US 11,630,785 B2
(45) Date of Patent: Apr. 18, 2023

(54) DATA STORAGE WITH IMPROVED DATA TRANSFER

(71) Applicant: Western Digital Technologies, Inc., San Jose, CA (US)

(72) Inventors: Refael Ben-Rubi, Rosh Haayin (IL); Moshe Cohen, Modi'in (IL)

(73) Assignee: Western Digital Technologies, Inc., San Jose, CA (US)

( * ) Notice: Subject to any disclaimer, the term of this patent is extended or adjusted under 35 U.S.C. 154(b) by 145 days.

(21) Appl. No.: 17/184,529

(22) Filed: Feb. 24, 2021

(65) Prior Publication Data
US 2022/0138122 A1 May 5, 2022

Related U.S. Application Data (60) Provisional application No. 63/109,233, filed on Nov. 3, 2020.

(51) Int. Cl.
*G06F 13/38* (2006.01)
*G06F 13/16* (2006.01)

(52) U.S. Cl.
CPC ............................... *G06F 13/1668* (2013.01)

(58) Field of Classification Search
CPC ...... G06F 13/1668; G06F 13/38; G06F 13/14; G06F 13/10
See application file for complete search history.

(56) References Cited

U.S. PATENT DOCUMENTS

| | | | |
|---|---|---|---|
| 4,486,750 A | 12/1984 | Aoki | |
| 5,058,005 A * | 10/1991 | Culley | G06F 13/28 710/25 |
| 5,357,469 A | 10/1994 | Sommer et al. | |
| 6,266,737 B1 | 7/2001 | Ware et al. | |
| 6,795,906 B2 * | 9/2004 | Matsuda | G06F 13/1694 365/233.13 |
| 10,203,909 B2 * | 2/2019 | Yoo | G06F 12/0868 |
| 10,340,022 B2 * | 7/2019 | Kim | G11C 16/06 |
| 10,489,061 B2 * | 11/2019 | Lee | G11C 11/408 |
| 10,679,717 B2 * | 6/2020 | Kim | G11C 16/06 |
| 10,929,064 B2 * | 2/2021 | Cho | G06F 3/0659 |
| 2016/0239224 A1 | 8/2016 | Bhavith et al. | |

(Continued)

FOREIGN PATENT DOCUMENTS

| | | | |
|---|---|---|---|
| CN | 101916589 A | 12/2010 | |
| CN | 111179986 A * | 5/2020 | G06F 12/0246 |

*Primary Examiner* — Cheng Yuan Tseng
(74) *Attorney, Agent, or Firm* — Patterson + Sheridan, LLP; Steven H. VerSteeg (57) ABSTRACT

The present disclosure generally relates to improving data transfer speed. A data storage device includes both a controller and a memory device. The controller provides instructions regarding read and/or write commands to the memory device through the use of control lines. The data to be written/read is transferred between the controller and the memory device along data lines. The control lines typically are not used during data transfer. During data transfer, the control lines can be used to increase data transfer speed by utilizing the otherwise idle control lines for data transfer in addition to the data lines. Hence, data transfer speed is increased by using not only the data lines, but additionally the control lines. Once the data transfer is complete, the control lines return to their legacy function.

16 Claims, 4 Drawing Sheets

(56) References Cited

U.S. PATENT DOCUMENTS

| | | | |
|---|---|---|---|
| 2020/0387450 A1* | 12/2020 | Lim | ............... G06F 12/0831 |
| 2022/0005539 A1* | 1/2022 | Kim | ............... G11C 29/44 |
| 2022/0066667 A1* | 3/2022 | Jung | ............... G06F 3/0604 |
| 2022/0215892 A1* | 7/2022 | Kim | ............... G11C 29/028 |

* cited by examiner

DATA STORAGE WITH IMPROVED DATA TRANSFER

CROSS-REFERENCE TO RELATED APPLICATIONS

This application claims benefit of U.S. provisional patent application Ser. No. 63/109,233, filed Nov. 3, 2020, which is herein incorporated by reference.

BACKGROUND OF THE DISCLOSURE

Field of the Disclosure

Embodiments of the present disclosure generally relate to improving data transfer speed.

Description of the Related Art

Data storage devices are used by host devices for storing data. In operation, the host device instructs the data storage device to either write new data to the memory device of the data storage device (i.e., a write operation) or read data from the memory device and deliver the read data to the host device (i.e., a read operation).

To perform the read or write operations, the host device provides a read or write command to the data storage device. The controller of the data storage device provides the appropriate command to the memory device where the data is stored, in the case of a read command, or where the data is to be stored, in the case of a write command.

The controller provides the relevant command along one or more control lines that connect the controller to the memory device. The data is transferred between the controller and the memory device along data lines which are distinct from the control lines. The data lines have a much higher throughput than the control lines.

The data transfer speed determines the throughput for a fixed number of data lines. Increasing data storage device throughput is always desired, but for a fixed number of lines, is limited. Therefore, there is a need in the art to improve data transfer speed.

SUMMARY OF THE DISCLOSURE

The present disclosure generally relates to improving data transfer speed. A data storage device includes both a controller and a memory device. The controller provides instructions regarding read and/or write commands to the memory device through the use of control lines. The data to be written/read is transferred between the controller and the memory device along data lines. The control lines typically are not used during data transfer. During data transfer, the control lines can be used to increase data transfer speed by utilizing the otherwise idle control lines for data transfer in addition to the data lines. Hence, data transfer speed is increased by using not only the data lines, but additionally the control lines. Once the data transfer is complete, the control lines return to their legacy function.

In one embodiment, a data storage device comprises: a memory device; and a controller coupled to the memory device, wherein the controller is configured to: send or receive data along one or more data lines coupling the memory device to the controller, wherein the one or more data lines operate at a first rate; and send or receive data along one or more control lines coupling the memory device to the controller, wherein the one or more control lines operate at a second rate that is less than the first rate.

In another embodiment, a data storage device comprises: one or more memory devices, the one or more memory devices comprising a plurality of first input/output devices, wherein the plurality of first input/output devices are capable of driving a signal bi-directionally; a controller coupled to the one or more memory devices, the controller comprising a flash interface module, wherein the flash interface module comprises a plurality of second input/output devices, wherein the plurality of second input/output devices are capable of driving a signal bi-directionally; one or more first data lines coupled between the plurality of first input/output devices and the plurality of second input/output devices; and one or more first control lines coupled between the plurality of first input/output devices and the plurality of second input/output devices.

In another embodiment, a data storage device comprises: a memory device; a controller coupled to the memory device; and means to transfer data between the memory device and the controller along both data lines and control lines, wherein the data lines are distinct from the control lines, and wherein the data lines are configured to transfer data at a greater speed than the control lines.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improving data transfer speed. A data storage device includes both a controller and a memory device. The controller provides instructions regarding read and/or write commands to the memory device through the use of control lines. The data to be written/read is transferred between the controller and the memory device along data lines. The control lines typically are not used during data transfer. During data transfer, the control lines can be used to increase data transfer speed by utilizing the otherwise idle control lines for data transfer in addition to the data lines. Hence, data transfer speed is increased by using not only the data lines, but additionally the control lines. Once the data transfer is complete, the control lines return to their legacy function.

Figure 1:
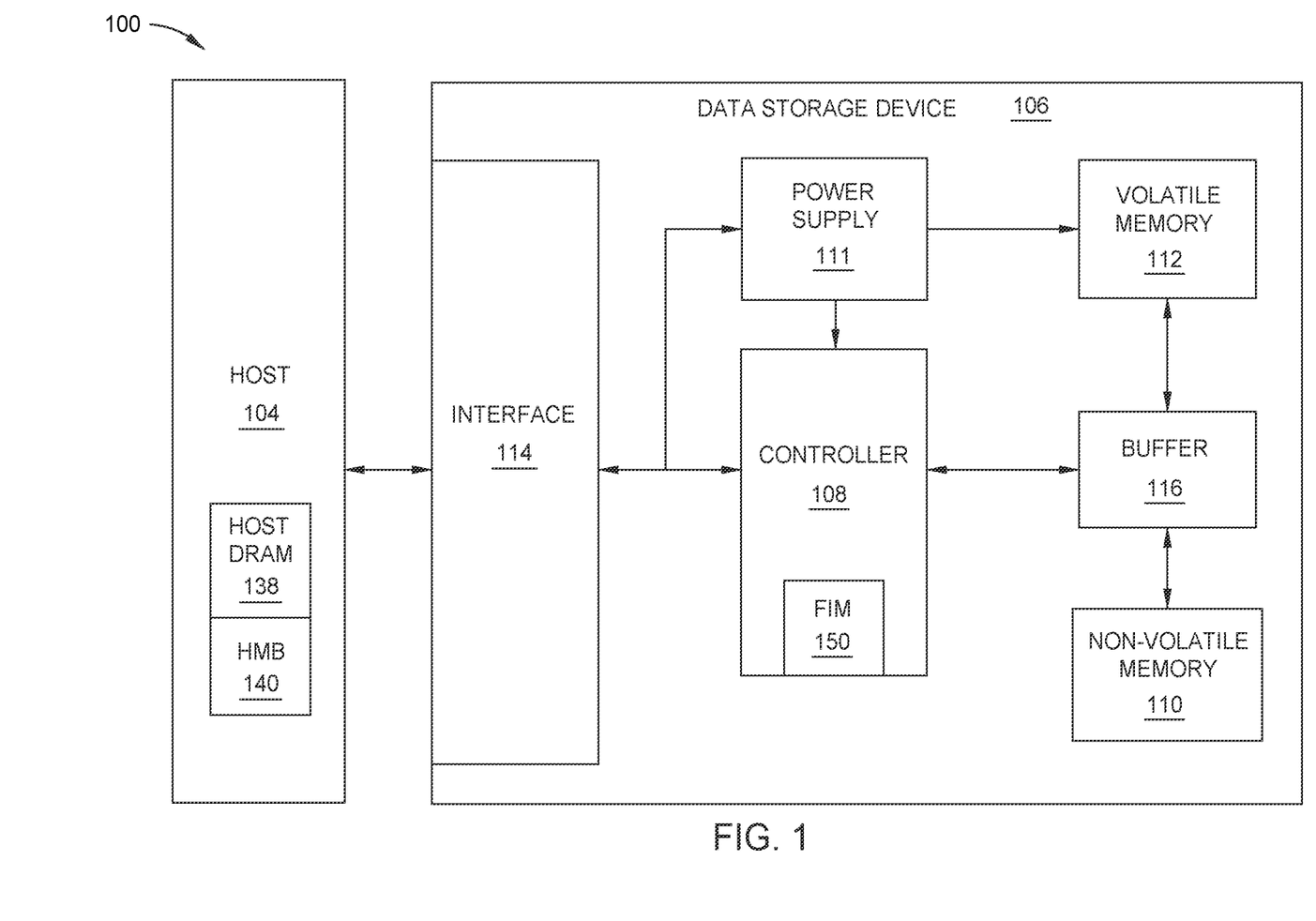
FIG. 1 is a schematic block diagram illustrating a storage system in which data storage device may function as a storage device for a host device, according to one embodiment.

FIG. 1 is a schematic block diagram illustrating a storage system 100 in which data storage device 106 may function as a storage device for a host device 104, according to disclosed embodiments. For instance, the host device 104 may utilize a non-volatile memory (NVM) 110 included in data storage device 106 to store and retrieve data. The host device 104 comprises a host DRAM 138, where a portion of the host DRAM 138 is allocated as a host memory buffer (HMB) 140. The HMB 140 may be used by the data storage device 106 as an additional working area or an additional storage area by the data storage device 106. The HMB 140 may be inaccessible by the host device 104 in some examples. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110. In some other embodiments, the HMB 140 may be utilized.

The controller 108 includes a flash interface module (FIM) 150. The FIM 150 may be configured to schedule the storage and retrieval of data from a location in the NVM 110. In certain embodiments, the controller 108 includes a plurality of FIMs, where each of the plurality of FIMs are coupled to a respective one or more dies of the NVM 110. For example, a FIM of the plurality of FIMs may be coupled to a die of the plurality of dies. In another example, the FIM of the plurality of FIMs may be coupled to more than one die of the plurality of dies. The FIM 150 manages the transfer of data from the controller 108 to the NVM 110, and vice-versa, through one or more data lines or data buses.

Figure 2:
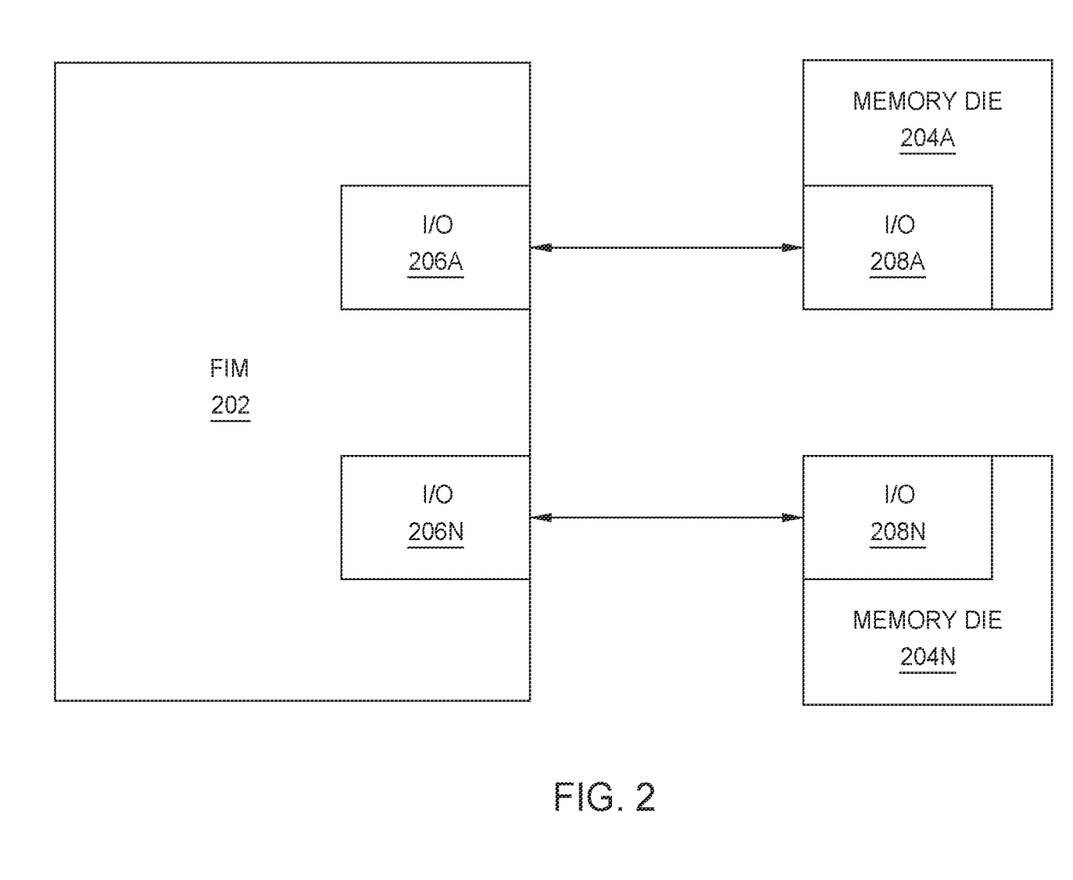
FIG. 2 is a schematic illustration of a flash interface module (FIM) coupled to memory devices, according to one embodiment.

FIG. 2 is a schematic illustration of a flash interface module (FIM) 202 coupled to a plurality of memory devices 204A, 204N, according to one embodiment. Aspects of the data storage device 106 of FIG. 1 may be similar to those illustrated in FIG. 2. The FIM 202 may be the FIM 150 of FIG. 1. Furthermore, the memory devices 204A, 204N may be memory dies of the NVM 110 of FIG. 1. In the description herein, the memory devices 204A, 204N may referred to as memory dies interchangeably for exemplary purposes. The FIM 202 includes a first FIM input/output (I/O) module 206A and an nth FIM I/O module 206N, where "N" refers to a maximum number of the component referenced. In some examples, the FIM 202 includes one FIM I/O module. In other embodiments the FIM 202 includes a plurality of I/O FIM modules. It is to be understood that while two memory dies 204A, 204N are shown, it is contemplated that a single memory device or a plurality of memory devices are contemplated. Accordingly, the number of FIM I/O modules 206A, 206N is contemplated to include a single FIM I/O module or a plurality of FIM I/O modules. It is also contemplated that the number of FIM I/O modules 206A, 206N is equal to the number of memory dies 204A, 204N.

Each FIM I/O module 206A, 206N of the FIM 202 is coupled to a respective die I/O module 208A, 208N of a memory die 204A, 204N, where "N" refers to a maximum number of the component referenced. For example, a first FIM I/O module 206A is coupled to a first die I/O module 208A of the first memory die 204A and an nth FIM I/O module 206N is coupled to an nth die I/O module of the nth memory die 204N. Though the FIM 202 may be coupled to a plurality of memory dies 204A, 204N, the FIM 202 may be configured to interact with a single memory die of the plurality of memory dies 204A, 204N such that the FIM 202 does not transfer data to more than one memory die in parallel. Furthermore, the FIM I/O modules and the die I/O modules may each include a plurality of bidirectional transistors, such that signal may be both accepted and sent from both the FIM I/O modules and the die I/O modules.

Furthermore, the coupling between the FIM I/O module of the FIM 202 and the respective die I/O module of the memory die allows for data, via data lines, and control information, via control lines, to be transferred between the FIM 202 and the respective memory die. The data lines may be considered to be fast lines and the control lines may be considered to be slow lines, where the fast lines may have a clock rate or a transfer rate that is substantially faster than the slow lines. For example, the fast lines may be faster than the slow lines by a factor of about 5. The previously listed value is not intended to be limiting, but to provide an example of a possible embodiment. Likewise, the control lines may operate at a lower frequency than the frequency of operation of the data lines. The transfer of data between the first FIM I/O module 206A and the first die I/O module 208A may occur independently of the data transfer between the nth FIM I/O module 206N and the nth die I/O module 208N, such that the transfers are nonparallel in time. Furthermore, the transfers may be in the same direction or in opposite directions.

Figure 3:
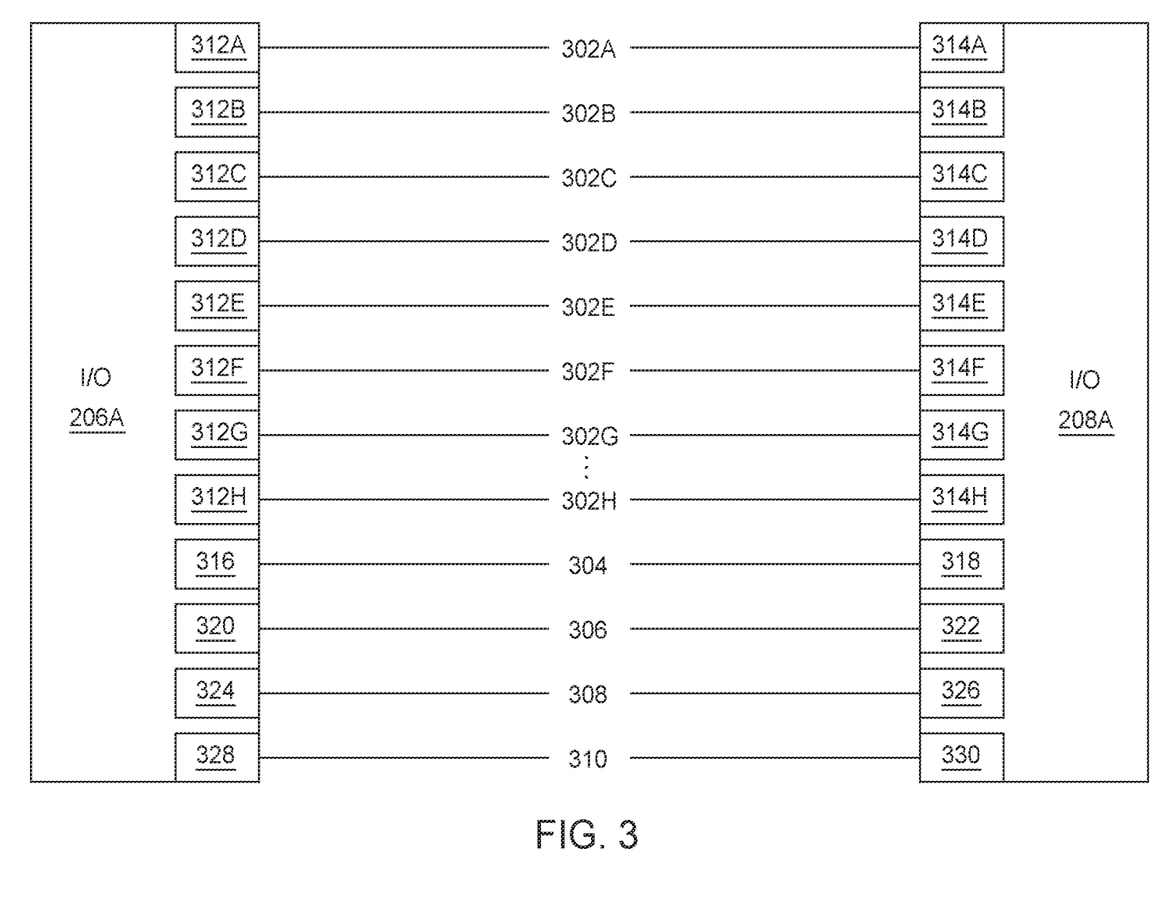
FIG. 3 is a schematic illustration of an input/output (I/O) module of a flash interface module (FIM) coupled to an I/O module of a memory device with data lines and control lines, according to one embodiment.

FIG. 3 is a schematic illustration of the first FIM I/O module 206A of FIG. 2, coupled to the first die I/O module 208A of FIG. 2, with data lines and control lines, according to one embodiment. Aspects of FIG. 2 may be similar to those described in FIG. 3. Though the first FIM I/O module 206A and the first die I/O module 208A are illustrated, the embodiments described herein may be applicable to any other FIM I/O module of the FIM of a controller, such as the controller 108 of FIG. 1, coupled to another die I/O module of the memory die of the plurality of memory dies of the NVM, such as the NVM 110 of FIG. 1.

The first FIM I/O module 206A includes a plurality of bidirectional transistors (herein referred to as FIM bidirectional transistors) 312A-312H, 316, 320, 324, 328. The first die I/O module 208A includes a plurality of bidirectional transistors (herein referred to as die bidirectional transistors) 314A-314H, 318, 322, 326, 330. Each FIM bidirectional transistor of the plurality of FIM bidirectional transistors 312A-312H, 316, 320, 324, 328 of the first FIM I/O module 206A are coupled to a respective die bidirectional transistor of the plurality of die bidirectional transistors 314A-314H, 318, 322, 326, 330 of the first die I/O module 208A.

For example, a first FIM bidirectional transistor 312A of the first FIM I/O module 206A is coupled to a first die bidirectional transistor 314A of the first die I/O module 208A. The coupling between the FIM bidirectional transistor 312A and the first die bidirectional transistor 314A may allow for data transfer, where the coupling is a first data line 302A. Likewise, a ninth FIM bidirectional transistor 316 may be coupled via a first control line 304 to a ninth die bidirectional transistor 318, such that control information may be transferred between the first FIM I/O module 206A and the first die I/O module 208A.

One or more data lines 302A-302H may couple the first FIM I/O module 206A to the first die I/O module 208A. In one example, the number of data lines is about eight data lines. In another example, the number of data lines is about sixteen data lines. In yet another embodiment, the number of data lines is greater than about eight data lines. Furthermore, one or more control lines 304, 306, 308, 310 may couple the first FIM I/O module 206A to the first die I/O module 208A. In one example, the number of control lines is about four control lines.

Furthermore, the one or more control lines 304, 306, 308, 310 may include a write protect (WP) line, a command latch enable (CLE) line, an address latch enable (ALE) line, and a chip enable (CE) line. The WP line enables the controller to control the write operations of the device between the FIM and the respective memory die. The CLE line controls the command input to the command register of the controller and/or data storage device. The ALE line controls the address input to the address register of the controller and/or data storage device. The CE line is configured to enable and disable the chip, such that when the CE line is enabled, read and write operations may occur.

It is to be understood that while a certain order of bidirectional transistors are shown, the order of the bidirectional transistors may be different in other embodiments applicable to the descriptions disclosed.

The one or more data lines 302A-302H may operate at a first rate to transfer data between the controller and the respective memory die of the NVM. Furthermore, rather than transferring control information along the one or more control lines 304, 306, 308, 310, the one or more control lines 304, 306, 308, 310 may be configured to transfer data between the controller and the respective memory die of the NVM. However, the one or more control lines 304, 306, 308, 310 may operate at a second rate, where the second rate is less than the first rate. In one example, the one or more data lines 302A-302H has a first operational frequency, where the first operational frequency is about 500 Mhrz. Furthermore, the one or more data lines 302A-302H includes 8 data lines, where the total rate of transfer or throughput is about 500 MB/sec. Likewise, the one or more control lines 304, 306, 308, 310 has a second operational frequency, where the second operation frequency is about 100 Mhrz. Furthermore, the one or more control lines 304, 306, 308, 310 includes 4 control lines, WP, CLE, ALE, and CE, where the total transfer rate or throughput is about 50 MB/sec. Thus, when using both the one or more data lines 302A-302H and the one or more control lines 304, 306, 308, 310 to transfer data between the controller and the respective die of the NVM, the total transfer rate or throughput may be about 550 MB/sec.

Prior to transferring data along the one or more control lines 304, 306, 308, 310, the controller is configured to send a command or instructions to the memory device to switch the functioning of the control line from one of sending control information to one of sending data. When the data transfer along the one or more control lines 304, 306, 308, 310, the controller is configured to send a command or instructions to the memory device to revert the functions of the one or more control lines 304, 306, 308, 310 to the legacy mode, where the legacy mode refers to transferring control information along the one or more control lines 304, 306, 308, 310.

During data transfer operations, the controller may be configured to transfer data in a first or an original order to the memory device via the one or more data lines 302A-302H and the one or more control lines 304, 306, 308, 310 in parallel, where the memory device is configured to accept and reorder the received transmitted data back to the first or the original order. It is to be understood that the process may also occur in the opposite direction. However, the transfer using the one or more data lines 302A-302H and the one or more control lines 304, 306, 308, 310 in parallel may be nonparallel in the operation time, such that a transfer using the one or more data lines 302A-302H may be faster than a transfer using the one or more control lines 304, 306, 308, 310. In certain examples, not every data line of the one or more data lines 302A-302H may be utilized and not every control line of the one or more control lines may be utilized in the data transfer operation.

The controller may execute the data transfer operation using a specific order of the one or more data lines 302A-302H and the one or more control lines 304, 306, 308, 310 (configured to send data) in order to maintain parallelism and minimize number of synchronization circuits and accumulating buffers in receiving partner. For example, the controller may instruct the FIM to transfer a first predetermined number of bytes via the one or more data lines 302A-302H and a second predetermined number of bytes via the one or control lines 304, 306, 308, 310. The number of bytes of the first predetermined number of bytes and the second predetermined number bytes may depend on the transfer rate of the one or more data lines 302A-302H and the one or more control lines 304, 306, 308, 310.

Table 1 below illustrates an embodiment of transferring data along both the one or more data lines 302A-302H and the one or more control lines 304, 306, 308, 310 in a specific order. In Table 1 below, the one or more data lines 302A-302H are D0-D7 and the one or more control lines 304, 306, 308, 310 are listed as ALE, CLE, WP, and CE. Furthermore, the ratio of transmission between the one or more data lines 302A-302H and the one or more control lines 304, 306, 308, 310 is about 2:1, where 2 bits are transferred via the one or more data lines 302A-302H for each bit transferred along the one or more control lines 304, 306, 308, 310. The 2 bits transferred are alternating with the 1 bit transferred such as to maintain parallelism. It is to be understood that while a 2:1 ratio is exemplified, other transfer ratios are possible and are dependent on the transfer rates of the one or more data lines 302A-302H and the one or more control lines 304, 306, 308, 310.

TABLE 1

| Source Buffer | Lines Used For Transmission |
|---|---|
| byte 0, 8 bits | D0-D7 |
| byte 1, lsb 4 bits | ALE, CLE, WP, CE |
| byte 1, msb 4 bits | D0-D3 |
| byte 2, lsb 4 bits | D4-D7 |
| byte 2, msb 4 bits | ALE, CLE, WP, CE |
| byte 3, 8 bits | D0-D7 |
| byte 4, lsb 4 bits | ALE, CLE, WP, CE |
| byte 4, msb 4 bits | D0-D7 |

The embodiment in Table 1 illustrates the nibbles that occurs for data transfer. The entire first byte, byte 0, which includes 8 bites is sent along the data lines D0-D7 in parallel. The next byte, which contains 8 bits, is split into two different groups of four bits, the least significant bit (lsb) and the most significant bit (msb). 4 of the bits of byte 1 can be sent along the control lines simultaneous with the entire byte 0. As there are no other data or control lines available, the remaining 4 bits of byte 1 are not transmitted simultaneously with the other 4 bits of byte 1. The remaining bites will be transmitted when transmission lines are available. Due to the fact that the data lines are faster than the control lines, the data lines will be available first. When the byte is split into two different transmission times, the lsb is transmitted prior to the msb. Hence, the 4 bits of byte 1 that are transmitted along the control lines contain the lsb. The remaining 4 bits of byte 1 will be transmitted on the first four data lines D0-D3.

The first 4 bits of byte 2 will be transmitted along data lines D4-D7 and will contain the lsb. The second 4 bits of byte 2, which contains the msb, will be transmitted along the control lines. The entire byte of byte 3 will be transmitted along data lines D0-D7. The first 4 bits of byte 4, which includes the lsb, will be transmitted along the control lines, and the last 4 bits of byte 4, which includes the msb, will be transmitted along the data lines D0-D3. The mapping of the data transmission will continue for additional bytes. Therefore, in an 8/4 data/control line situation, every third byte will be transmitted in its entirety along the data lines.

Figure 4:
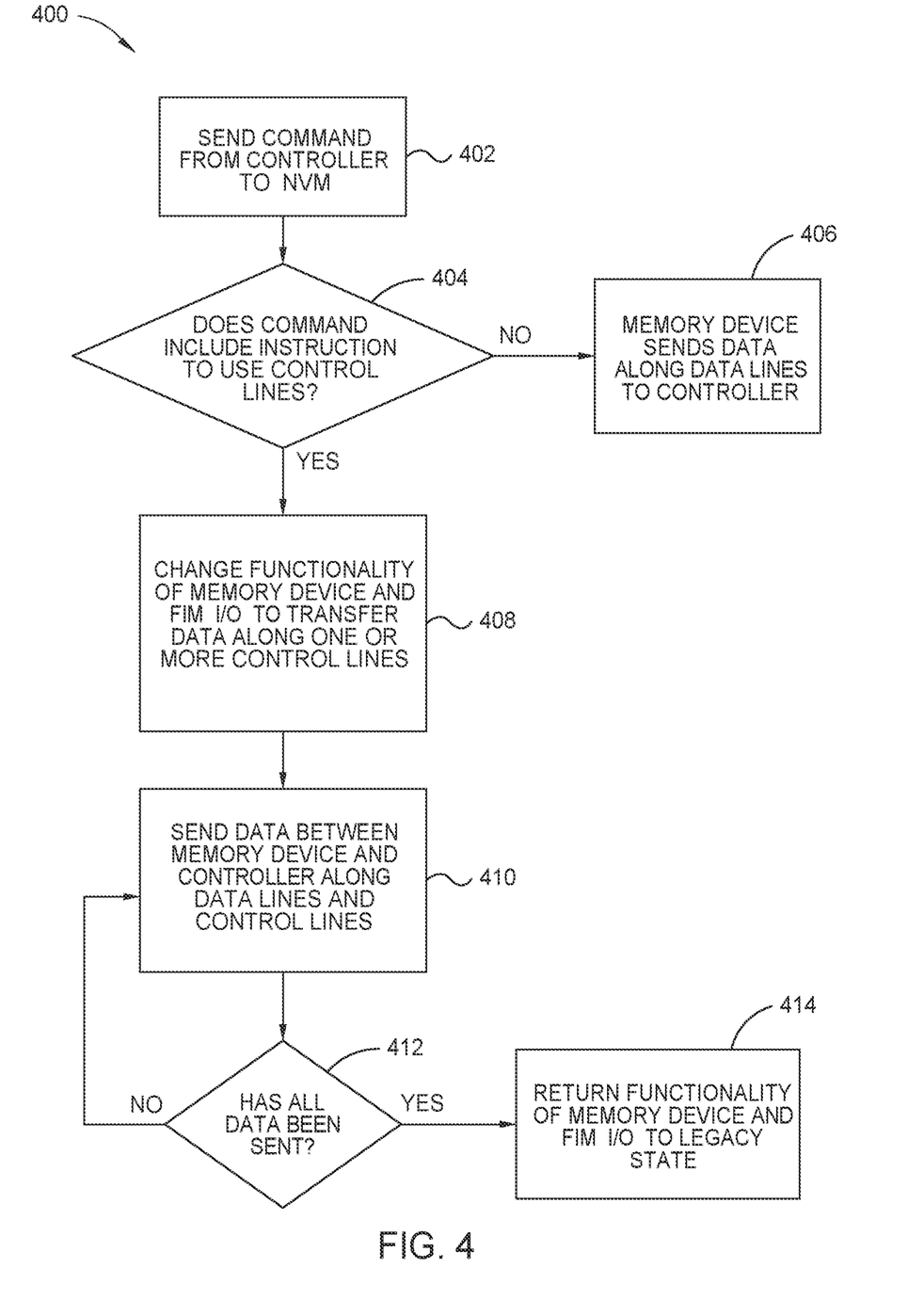
FIG. 4 is a flowchart illustrating a method of transferring data between a controller and a memory device, according to one embodiment.

FIG. 4 is a flowchart illustrating a method 400 of transferring data between a controller, such as the controller 108 of FIG. 1, and a memory device, such as the one or more memory dies 204A, 204N of FIG. 2, according to one embodiment. Aspects of FIG. 3 may be utilized to aid in the description of the method 400 of FIG. 4. It is to be understood that while a first data transfer direction is exemplified, the description herein is applicable to a second data transfer direction, where the first data transfer direction is opposite of the second data transfer direction.

At block 402, the controller sends a command to the NVM to read or retrieve data from a respective memory die of the NVM. At block 404, a first memory device, such as the first memory die 204A of FIG. 2, determines if the command of block 402 includes instructions to use the one or more control lines, such as the one or more control lines 304, 306, 308, 310, to transfer the relevant data. If the command does not include instructions to use the one or more control lines to transfer data, then the first memory device, sends the relevant data along the one or more data lines, such as the one or more data lines 302A-302H of FIG. 3, to the controller at block 406.

However, if the command does include instructions to use the one or more control lines to transfer data from the first memory device to the controller, the functionality of the I/O module of the memory device, such as the first die I/O module 208A of FIG. 2, and the functionality of the I/O module of the FIM, such as the first FIM I/O module 206A of FIG. 2, is changed to allow transferring data along the one or more control lines at block 408. The instructions may include a first instruction to enable the CE line and a second instruction stating that the CE has an additional function, where the additional function is to transfer data.

At block 410, the relevant data is sent between the first memory device and the controller along both the one or more data lines and the one or more control lines. When sending the data along both the one or more data lines and the one or more control lines, the data may be sent according to a transfer rate of the one or more data lines and the one or more control lines, such that parallelism is maintained. The sending according to a transfer rate is described in Table 1 above. For example, the controller may instruct the memory device to transfer a first number of bytes via the one or more data lines and a second number of bytes via the one or more control lines. The first number of bytes may be greater than the second number of bytes due to a fast transfer rate of the one or more data lines when compared to the one or more control lines. Furthermore, when receiving the relevant data, the receiver (i.e., the controller FIM in the current example) is configured to reorder the received data back to the original order, where the original order is the order at the origin (i.e., the memory device in the current example).

At block 412, the controller determines if all the data has been sent. If not all the data has been sent from the memory device to the controller, then the method 400 returns to block 410. However, if the controller determines that all the data has been sent at block 412, then the controller returns functionality of the I/O module of the memory device and the functionality of the I/O module of the FIM back to the legacy state, where the one or more control lines are reverted from transferring data to transferring control information. It is contemplated that the return to legacy state can occur automatically after all data has been transferred. In such a situation, the controller instructs the memory device to return to legacy state automatically upon completion of data transferring.

By utilizing both data lines as well as control lines during data transfer between a controller and a memory device, data transfer time can be decreased.

In one embodiment, a data storage device comprises: a memory device; and a controller coupled to the memory device, wherein the controller is configured to: send or receive data along one or more data lines coupling the memory device to the controller, wherein the one or more data lines operate at a first rate; and send or receive data along one or more control lines coupling the memory device to the controller, wherein the one or more control lines operate at a second rate that is less than the first rate. The one or more data lines comprises at least eight data lines. The one or more control lines comprises a write protect line, a command latch enable line, an address latch enable line, and a chip enable line. The controller is configured to take data from an original order and transmit data along the one or more data lines and the one or more control lines in parallel. The controller is further configured to accept and reorder the data transmitted along the one or more data lines and the one or more control lines into the original order. The controller is configured to instruct the memory device to send data along the one or more control lines. The controller instructs the memory device using the one or more control lines. The controller instructs the memory device to switch the one or more control lines from functioning as a data line back to functioning as a control line. The controller instructs the memory device prior to the memory device sending data along the one or more control lines.

In another embodiment, a data storage device comprises: one or more memory devices, the one or more memory devices comprising a plurality of first input/output devices, wherein the plurality of first input/output devices are capable of driving a signal bi-directionally; a controller coupled to the one or more memory devices, the controller comprising a flash interface module, wherein the flash interface module comprises a plurality of second input/output devices, wherein the plurality of second input/output devices are capable of driving a signal bi-directionally; one or more first data lines coupled between the plurality of first input/output devices and the plurality of second input/output devices; and one or more first control lines coupled between the plurality of first input/output devices and the plurality of second input/output devices. The plurality of first input/output devices comprise transistors. The plurality of second input/output devices comprise transistors. The one or more memory devices comprises a first memory device and a second memory device. The controller is configured to instruct the first memory device to transmit data along the one or more first control lines. The controller is configured to transmit data between the controller and the first memory device nonparallel in time with transmitting data between the controller and the second memory device. The controller is configured to ensure that, after transmitting data to or from the first memory device, the plurality of second input/output devices have returned to a legacy mode prior to sending or receiving data or control information to the second memory device, wherein the legacy mode is capable of transmitting control signals from the controller.

In another embodiment, a data storage device comprises: a memory device; a controller coupled to the memory device; and means to transfer data between the memory device and the controller along both data lines and control lines, wherein the data lines are distinct from the control lines, and wherein the data lines are configured to transfer data at a greater speed than the control lines. The means to transfer data between the memory device and the controller along both data lines and control lines is capable of driving a signal bi-directionally. The control lines operate at a frequency lower than a frequency at which the data lines operate. The controller is configured to: instruct the memory device to transfer a predetermined number of bytes; instruct the memory device to use the control lines for transferring the predetermined number of bytes; and instruct the memory device to automatically change functionality of the control lines to function as control lines rather than data lines upon completion of the transferring.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
send or receive data along one or more data lines coupling the memory device to the controller, wherein the one or more data lines operate at a first rate;
send or receive data along one or more control lines coupling the memory device to the controller, wherein the one or more control lines operate at a second rate that is less than the first rate;
take data from an original order and transmit data along the one or more data lines and the one or more control lines in parallel; and
accept and reorder the data transmitted along the one or more data lines and the one or more control lines into the original order.

2. A data storage device, comprising:
a memory device; and
a controller coupled to the memory device, wherein the controller is configured to:
send or receive data along one or more data lines coupling the memory device to the controller, wherein the one or more data lines operate at a first rate;
send or receive data along one or more control lines coupling the memory device to the controller, wherein the one or more control lines operate at a second rate that is less than the first rate; and
instruct the memory device to send data along the one or more control lines; and
instruct the memory device to switch the one or more control lines from functioning as a data line back to functioning as a control line.

3. A data storage device, comprising:
one or more memory devices, the one or more memory devices comprising a plurality of first input/output devices, wherein the plurality of first input/output devices are capable of driving a signal bi-directionally;
a controller coupled to the one or more memory devices, the controller comprising a flash interface module, wherein the flash interface module comprises a plurality of second input/output devices, wherein the plurality of second input/output devices are capable of driving a signal bi-directionally;
one or more first data lines coupled between the plurality of first input/output devices and the plurality of second input/output devices; and
one or more first control lines coupled between the plurality of first input/output devices and the plurality of second input/output devices, wherein the controller is configured to:
instruct the one or more memory devices and the flash interface module to switch the one or more first control lines from functioning as a control line to function as a data line;
instruct the one or more memory devices and the flash interface module to send data along the one or more first control lines; and
instruct the one or more memory devices and the flash interface module to switch the one or more first control lines from functioning as the data line back to functioning as the control line.

4. A data storage device, comprising:
a memory device;

a controller coupled to the memory device, wherein the controller is configured to:
  instruct the memory device to transfer a predetermined number of bytes;
  instruct the memory device to use the control lines for transferring the predetermined number of bytes; and
  instruct the memory device to automatically change functionality of the control lines to function as control lines rather than data lines upon completion of the transferring; and
means to transfer data between the memory device and the controller along both data lines and control lines, wherein the data lines are distinct from the control lines, and wherein the data lines are configured to transfer data at a greater speed than the control lines.

5. The data storage device of claim 1, wherein the one or more data lines comprises at least eight data lines.

6. The data storage device of claim 1, wherein the one or more control lines comprises a write protect line, a command latch enable line, an address latch enable line, and a chip enable line.

7. The data storage device of claim 2, wherein the controller instructs the memory device using the one or more control lines.

8. The data storage device of claim 2, wherein the controller instructs the memory device prior to the memory device sending data along the one or more control lines.

9. The data storage device of claim 3, wherein the plurality of first input/output devices comprise transistors.

10. The data storage device of claim 9, wherein the plurality of second input/output devices comprise transistors.

11. The data storage device of claim 3, wherein the one or more memory devices comprises a first memory device and a second memory device.

12. The data storage device of claim 11, wherein the controller is configured to instruct the first memory device to transmit data along the one or more first control lines.

13. The data storage device of claim 11, wherein the controller is configured to transmit data between the controller and the first memory device nonparallel in time with transmitting data between the controller and the second memory device.

14. The data storage device of claim 11, wherein the controller is configured to ensure that, after transmitting data to or from the first memory device, the plurality of second input/output devices have returned to a legacy mode prior to sending or receiving data or control information to the second memory device, wherein the legacy mode is capable of transmitting control signals from the controller.

15. The data storage device of claim 4, wherein the means to transfer data between the memory device and the controller along both data lines and control lines is capable of driving a signal bi-directionally.

16. The data storage device of claim 4, wherein the control lines operate at a frequency lower than a frequency at which the data lines operate.

* * * * *